UNITED STATES PATENT OFFICE.

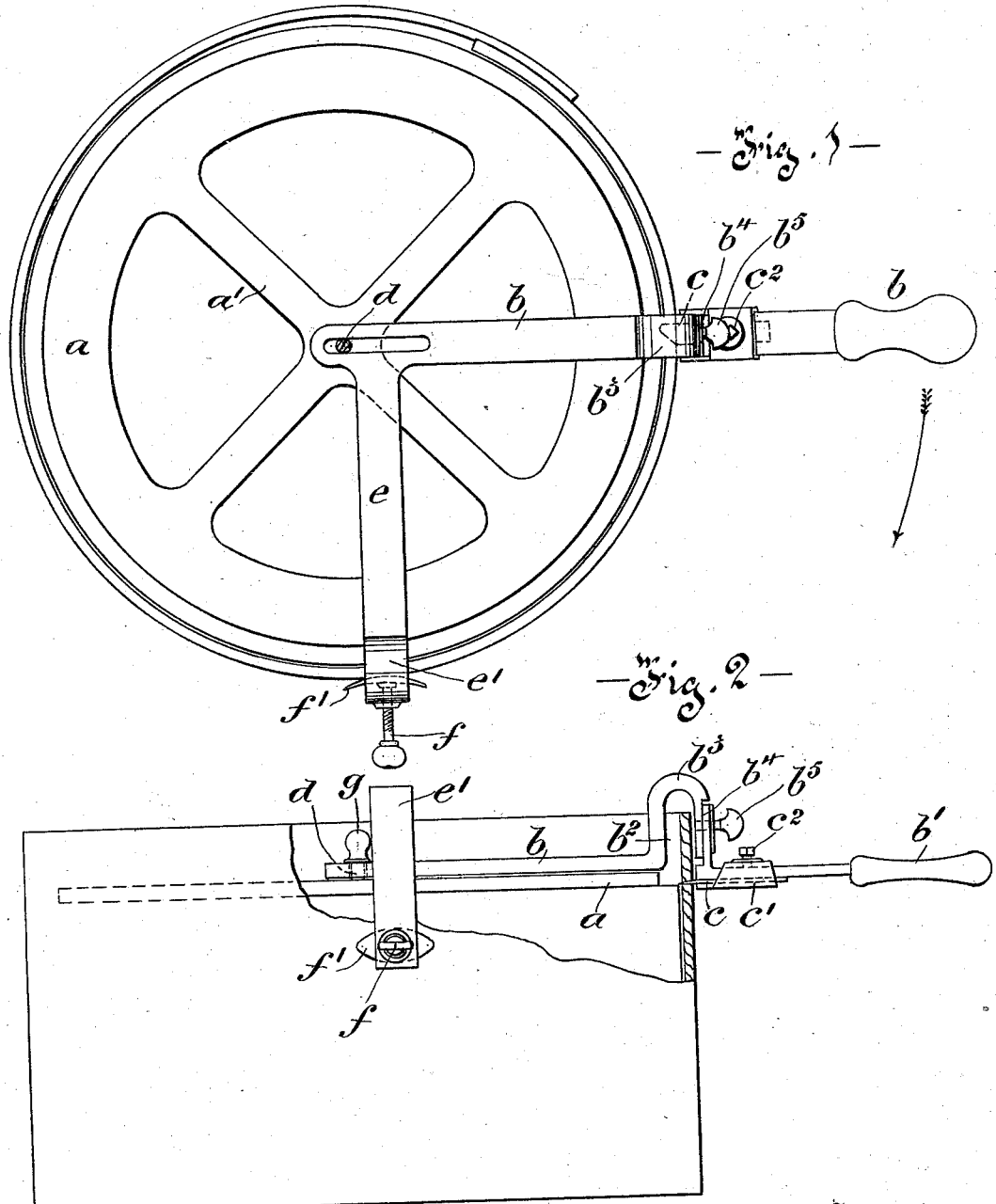

RUBEN A. OAKLEY, OF MONTREAL, CANADA.

CHEESE-BOX TRIMMER.

SPECIFICATION forming part of Letters Patent No. 547,498, dated October 8, 1895.

Application filed August 4, 1894. Serial No. 519,511. (No model.)

*To all whom it may concern:*

Be it known that I, RUBEN AUGUSTUS OAKLEY, of the city of Montreal, in the district of Montreal and Province of Quebec, Canada, have invented certain new and useful Improvements in Cheese-Box Trimmers; and I do hereby declare that the following is a full, clear, and exact description of the same.

This invention relates to means for trimming or reducing the height of the sides of cheese-boxes to any desired level with relation to the tops of the cheeses therein, as in many cases the cheese is too small to completely fill the box, and consequently it is free to be shaken and knocked about, whereas when the bottom and top of the box fit it snugly this does not happen, and at other times it is required to cut the box of a height lower than that of the cheese to allow for the usual shrinkage.

The invention consists, broadly speaking, of a tool or appliance comprising a bearing-plate and a cutter pivotally connected therewith so arranged that the bearing-plate rests on the top of the cheese and the cutter is swung around the box, cutting away any desired amount of the sides of the box.

For full comprehension, however, of the invention, reference must be had to the annexed drawings, forming a part of this specification, in which like symbols indicate corresponding parts, and wherein—

Figure 1 is a plan view of a cheese-box, showing the cheese and the trimming appliance in place; Fig. 2, a side elevation, partly broken away.

A suitable bearing-plate, which may be of any desirable form, but preferably circular, and of slightly less diameter than that of the average size of cheese and constructed either of metal, wood, or other suitable material, is shown in the form of a flat ring $a$, with inner radial arms $a'$. To the center of this bearing-plate is pivoted the cutter, preferably in the form of an arm or lever $b$, provided with handle portion $b'$ and carrying a removable cutting-blade $c$, secured on the under side of the lever by a sleeve $c'$ and set-screw $c^2$ and adjusted in such a position that its edge will project inward in the direction of the axis of the pivot and partially across the mouth of a recess $b^2$, formed by an upward bend or bridge-section $b^3$ of the lever. This recess $b^2$ is to accommodate the edge of the cheese-box extending above the cheese, and the outer section of the lever to which the cutting-edge is attached is shown in this case on a lower plane than the inner section, which rests on the bearing-plate in order that the knife will be flush with the lower edge of such bearing-plate—that is, in contact with the cheese. The inner end of the cutter-lever is slotted, so that it can be adjusted radially upon the pivot-pin $d$, fixed centrally in the bearing-plate, to suit boxes of different diameters and, further, to allow of the knife-edge being inserted into the wood, as shown in Fig. 2. I also prefer to make in one piece with the cutter-lever an adjustment or guide bar or arm $e$, which extends at right angles from one side of same at the inner slotted end and is formed at its outer end with a bend $e'$, also furnishing a recess similar to the recess $b^2$ to accommodate the edge of the box, but being somewhat wider than the one in the cutter-lever in order to allow for the play or adjustment of a horizontal adjusting-screw $f$, having on its inner end a curved runner or bearing-face $f'$ to facilitate its travel over the outer surface of the box. The pivot-pin $d$ is preferably formed with an enlarged knob $g$ to form a convenient handle by which the appliance can be held steadily in position.

In using the appliance the bearing-plate is set on top of the cheese in the box, the cutter-lever being shifted sufficiently to allow the edge of the box to enter the recesses for its accommodation, after which the adjusting-screw carried by the guide-bar is moved inward to bear against the surface of the box and so keep the part in the same relative position throughout the complete travel of the cutter around the box, the cutting-edge being first inserted in the side of the box by a slight centripetal movement of the lever and then drawn around it in the direction indicated by the arrow in Fig. 1. If desired, the portion $b^4$ of lever $b$ can be made adjustable as to length (so as to regulate its cutting level with relation to the cheese) by forming it in two pieces and connecting them together by set-screw $b^5$.

What I claim is as follows:

1. A cheese box trimmer or appliance in the form of a stationary annular bearing plate presenting a smooth bearing face adapted to rest upon the cheese within the box, an integral pivot pin projecting upwardly from and centrally of said plate, a lever extending across the edge of the box, connected with such pivot pin and held against disconnection therefrom, carrying a cutting blade at a point outside of such box and adapted to be swung or rotated about same with the cutting edge in cutting contact therewith.

2. A cheese box trimmer or appliance in the form of a stationary annular bearing plate presenting a smooth bearing face adapted to rest upon the cheese within the box, an integral pivot pin projecting upwardly from and centrally of said plate, a lever extending across the edge of such box, having a sliding or variable pivoting or fulcrum connection with such pivot pin, but held against disconnection therefrom, carrying a cutting blade at a point outside of same, and adapted to be swung or rotated about the box with the cutting edge in cutting contact therewith.

3. A cheese box trimmer or appliance in the form of a lever extending across the edge of the cheese box, having a pivoting point within the box and carrying a cutting blade at a point outside of such box; a guide arm extending across the edge of the cheese box at an angle to said lever and the lever adapted to be swung or rotated about the box with the said cutting edge in cutting contact therewith.

4. A cheese box trimmer or appliance in the form of a stationary annular bearing plate presenting a smooth bearing face adapted to rest upon the cheese within the box, an integral pivot pin projecting upwardly from and centrally of said plate, and a lever having a slotted inner end within the box fitting such pivot pin, but held against disconnection therefrom, carrying a cutting blade between the pivoting point and handle thereof and adapted to be rotated or swung about the box with the cutting edge in cutting contact therewith.

5. A cheese box trimmer or appliance in the form of an annular bearing plate presenting a smooth bearing face adapted to rest upon the cheese within the box, an integral pivot pin projecting from said plate centrally of same, and a lever having a pivoting point within the box upon said pin carrying a cutting blade capable of vertical adjustment and adapted to be rotated or swung about the box with the cutting edge in cutting contact therewith.

6. A cheese box trimmer or appliance in the form of an annular bearing plate presenting a smooth bearing face adapted to rest upon the cheese within the box, an integral pivot pin projecting upwardly from and centrally of said plate and a lever having a pivoting point within the box upon said pin carrying a cutting blade and capable of horizontal adjustment and adapted to be rotated or swung about the box with the cutting edge in cutting contact therewith.

7. A cheese box trimmer or appliance in the form of a bearing plate presenting a smooth bearing face adapted to rest upon the cheese within the box, an integral pivot pin projecting upwardly from and centrally of said plate and a lever having a pivoting point within the box upon said pin carrying a cutting blade capable of vertical and horizontal adjustment and adapted to be rotated or swung about the box with the cutting edge in cutting contact therewith.

8. In a cheese box trimmer or appliance, the combination of bearing plate $a$ adapted to rest upon the cheese within the box; a lever $b$ pivotally connected with said plate extending across the edge of the box, recessed to accommodate such edge, a cutting blade $c$ carried by said lever at a point outside of said box, a guide arm $e$ extending from said lever at an angle thereto across the edge of the box and bent at its outer end to form an accommodating recess for such edge, and an adjusting screw $f$ carried by the end of said guide bar to bear upon the surface of the box, the lever and arm adapted to be swung or rotated about the box with the cutting blade in cutting contact therewith.

Montreal, 16th day of July, 1894.

RUBEN A. OAKLEY.

Witnesses:
WILL P. McFEAT,
R. ALF SPINLER.